United States Patent
Smith

[15] 3,648,644
[45] Mar. 14, 1972

[54] PONTOON VESSEL
[72] Inventor: Leedice S. Smith, Elk, Wash. 99009
[22] Filed: Apr. 13, 1970
[21] Appl. No.: 27,732

[52] U.S. Cl. ................................................115/26, 115/63
[51] Int. Cl. ..........................................................B63h 16/12
[58] Field of Search ................115/23, 25, 26, 63, 22, 26.25, 115/63

[56] References Cited

UNITED STATES PATENTS

| | | | |
|---|---|---|---|
| 2,685,270 | 8/1954 | Pieraccioni Dit Pierac | 115/63 X |
| 956,533 | 5/1910 | Krause et al. | 115/26 |

*Primary Examiner*—Andrew H. Farrell
*Attorney*—Wells, St. John & Roberts

[57] ABSTRACT

A pontoon vessel comprising a molded horizontal platform having longitudinal pontoons secured to its underside. A pedal-operated belt extends longitudinally between the pontoons and carries transverse paddles for imparting movement to the vessel. The belt is located within a central elevated enclosure bounded by recessed wells, all formed integrally with the platform. A special tensioning arrangement is provided for the pedal-operated belt. The belt has paddles, as well a symmetrical rudder, all lie within the elevational boundries of the pontoons. A seat for the user of the vessel straddles the elevated enclosure.

10 Claims, 15 Drawing Figures

Patented March 14, 1972

INVENTOR.
Leedice S. Smith
BY
Wells, St.John & Roberts
Attys.

Patented March 14, 1972

INVENTOR.
Leedice S. Smith
BY
Wells, St. John & Roberts
Attys.

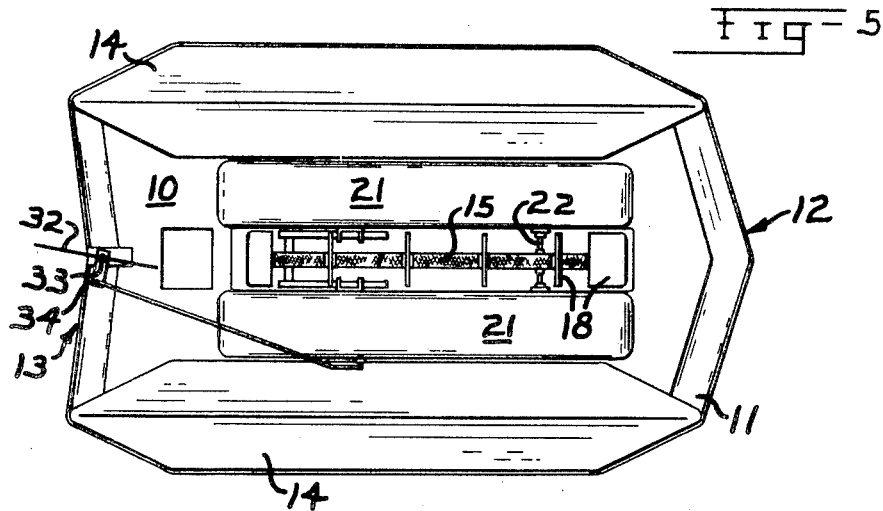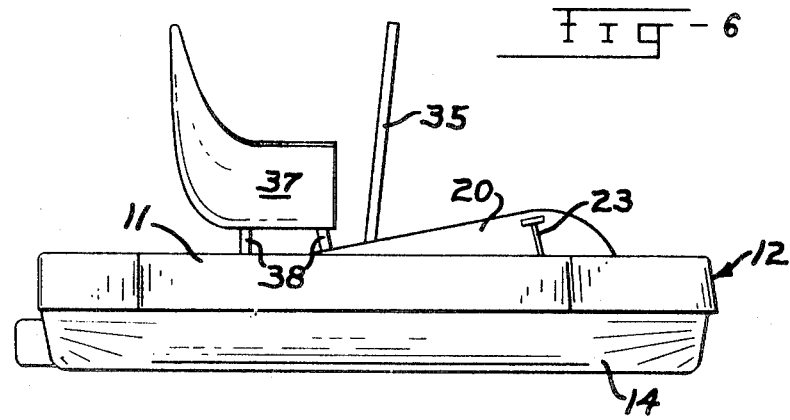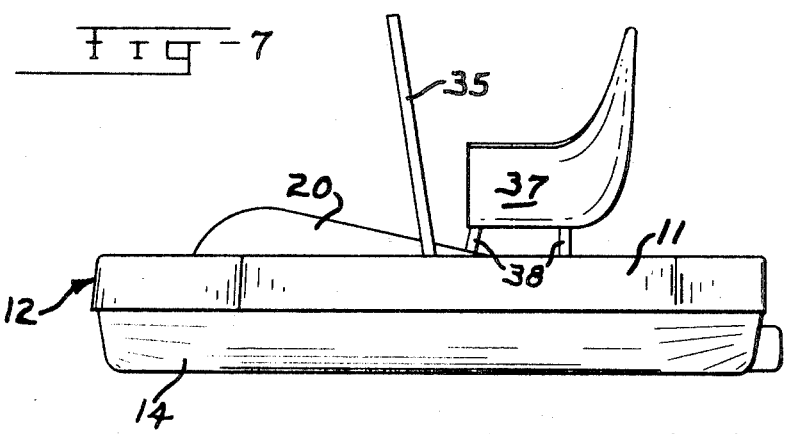

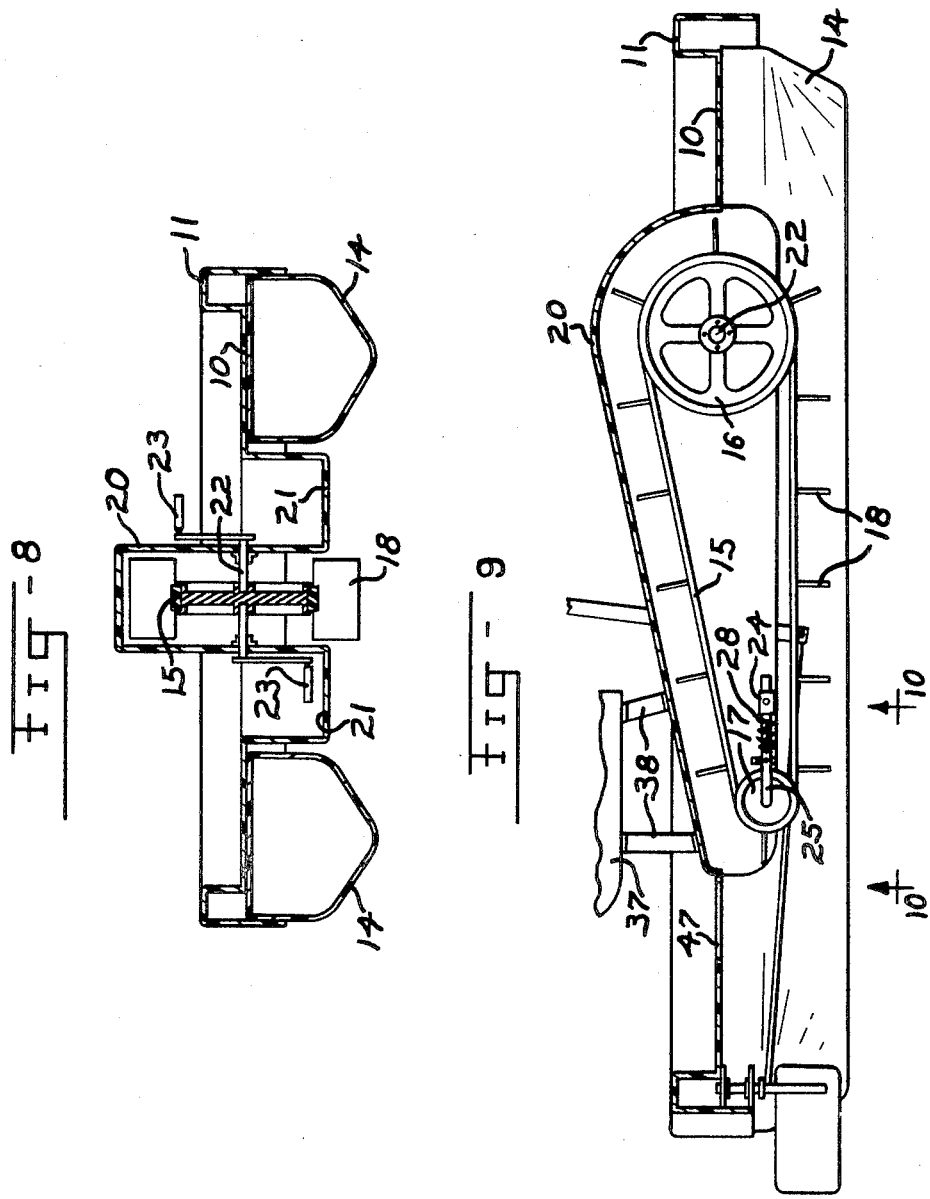

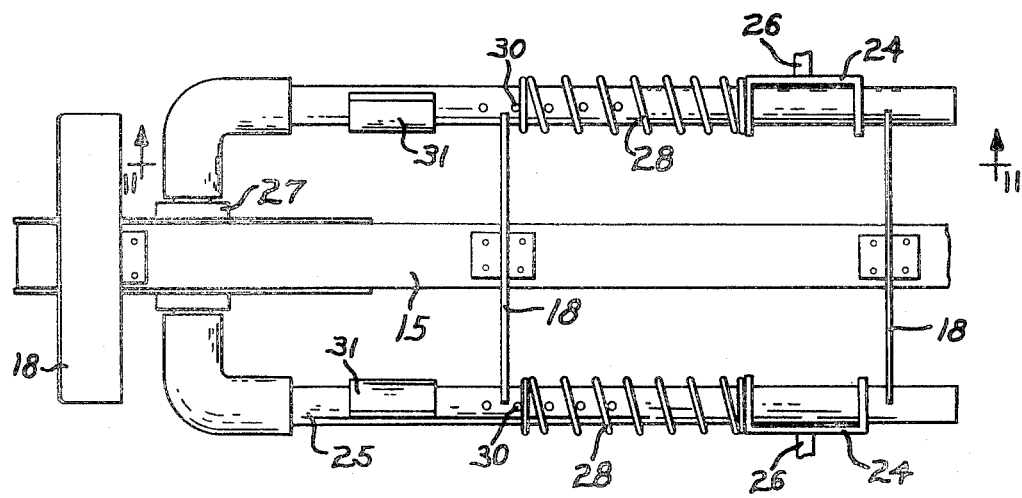
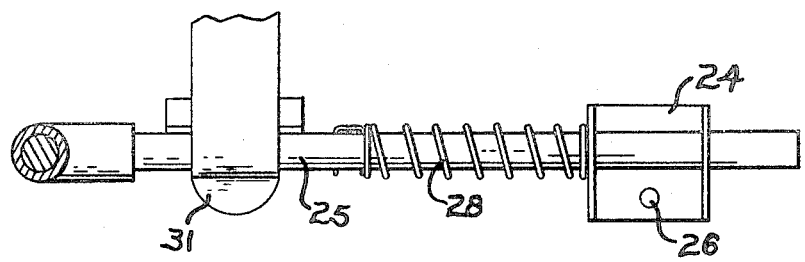

Patented March 14, 1972

INVENTOR.
Leedice S. Smith

BY
Wells, St. John & Roberts
Attys.

PONTOON VESSEL

BACKGROUND OF THE INVENTION

The present pontoon vessel has been developed to meet the demand for a manually powered boat that can be operated safely on relatively still water, such as on a small lake or pond. It is designed specially for fishing or other recreational purposes. It is particularly adaptable for use by the elderly and by young children. The vessel has a relatively wide pontoon support structure which is incapable of sinking. It includes a comfortable seat for a single occupant, with a readily accessible handle for steering and pedals for powering the vessel in a forward or rearward direction. The occupant is located above the water surface with clear access to either side of the vessel for fishing purposes.

The belt and paddles used to propel the boat, and the rudder used for steering, are each elevated above the lower surfaces of the pontoon. The vessel can therefore be beached or set upon a dock without damaging the moving elements. It also can be operated safely in relatively shallow water or in water with weeds near the surface.

The vessel has also been designed to make maximum use of modern flotation materials, such as resins foamed in place, which can be used within the pontoons and a peripheral rim that extends about the platform. The resulting vessel is extremely stable, permitting an occupant to safely stand and move about with relative ease.

SUMMARY OF THE INVENTION

This invention relates to a pontoon vessel comprising a substantially horizontal platform with a pair of longitudinal pontoons fixed to its underside and spaced transversely from one another. Included in a pedal-operated paddle assembly mounted on the platform between the pontoons. The paddle assembly includes a longitudinal belt having a lower horizontal flight parallel to and elevationally above the lower pontoon surfaces, a plurality of parallel paddles along the belt and manually operated pedals connected to the supporting pulleys for the belt. Adjustable tension supports are provided for the belt, and an adjustable seat is mounted on the elevated enclosure that houses the paddle assembly.

It is one object of this invention to provide a relatively inexpensive molded pontoon vessel for use by individuals of any age, requiring little skill on the part of the user for complete control of the vessel.

Another object of the invention is to provide an improved paddle drive for a pontoon vessel with means for maintaining proper tension in the paddle assembly.

Another object of the invention is to provide an improved seating arrangement straddling the raised enclosure for the paddle assembly.

These and further objects will be apparent from the following disclosure, taken together with the accompanying drawings, which illustrate a preferred embodiment of the invention. Modifications may be made in the mechanical devices illustrated without deviating from the scope of the application, which is defined in the appended claims.

BRIEF DESCRIPTION OF THE DRAWINGS

FIG. 5 is a bottom view;
FIG. 6 is a side elevation view from the left in FIG. 1;
FIG. 7 is a side elevation view opposite to FIG. 6;
FIG. 8 is an enlarged transverse sectional view taken along lines 8—8 in FIG. 2;
FIG. 9 is an enlarged longitudinal sectional view taken along line 9—9 in FIG. 2;
FIG. 10 is an enlarged bottom view of the belt tensioning assembly as seen substantially along line 10—10 in FIG. 9;
FIG. 11 is a sectional view taken along line 11—11 in FIG. 10.

DESCRIPTION OF THE PREFERRED EMBODIMENT

Figure 1:
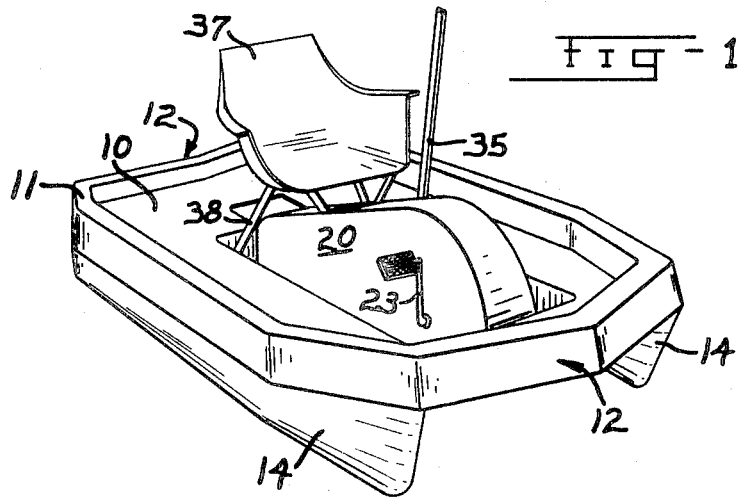
FIG. 1 is a perspective view of the pontoon vessel.
Figure 2:
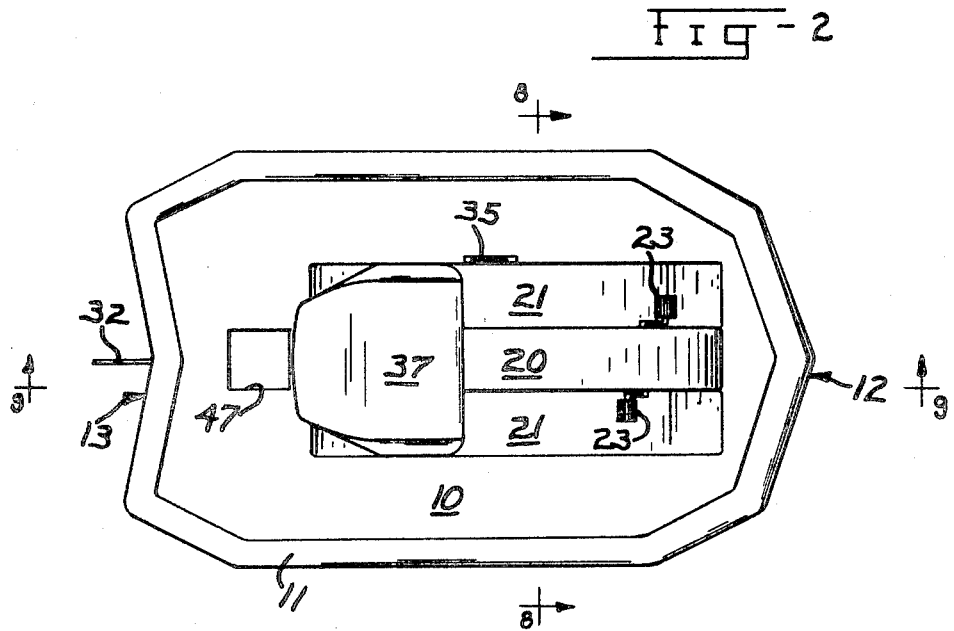
FIG. 2 is a top view.
Figure 3:
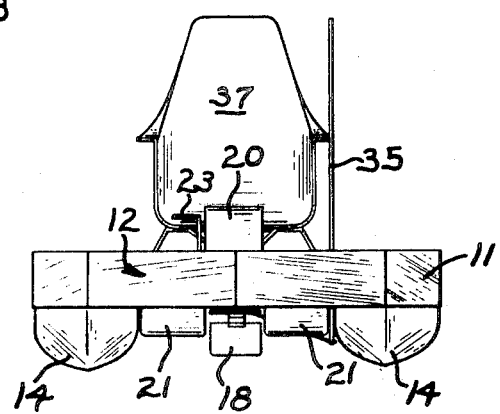
FIG. 3 is a front view.
Figure 4:
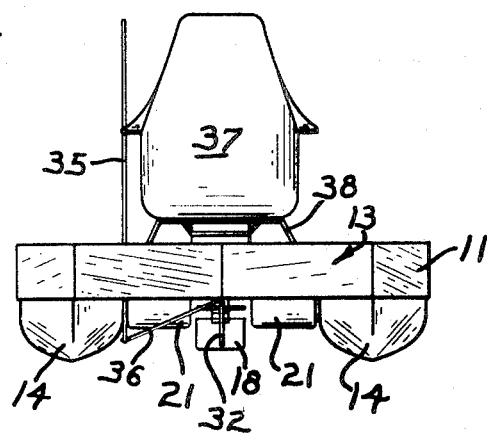
FIG. 4 is a rear view.
Figure 12:
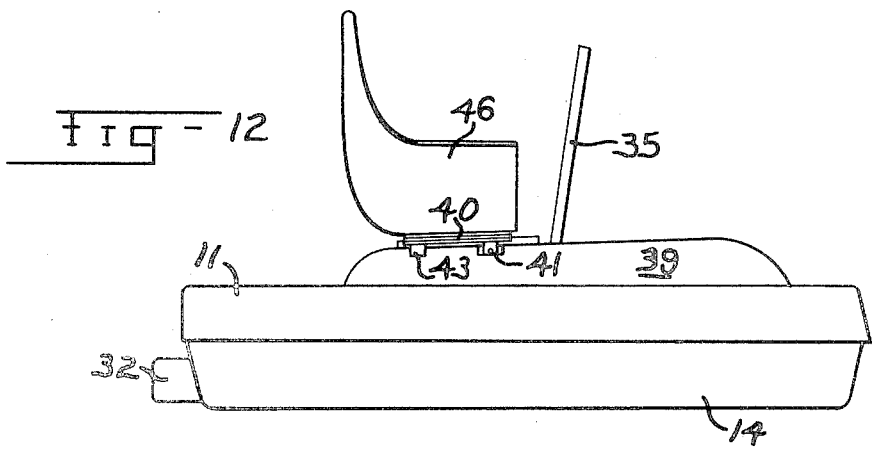
FIG. 12 is a view similar to FIG. 6, showing a modified seat assembly.
Figure 13:
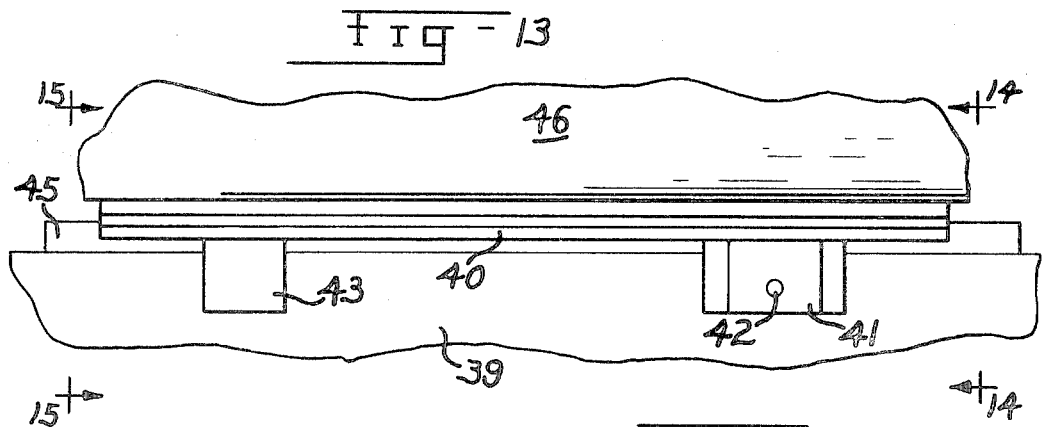
FIG. 13 is an enlarged side elevation view of the seat mounting apparatus.
Figure 14:
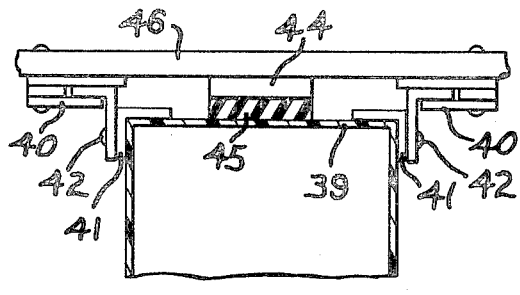
FIG. 14 is a transverse sectional view taken along line 14—14 in FIG. 13.

The general features of the pontoon vessel can best be understood from a study of FIGS. 1 through 7, which illustrate the fully assembled unit. It includes a molded horizontal platform 10 bounded by an integral elevated rim 11. The peripheral rim 11 terminates in an outside vertical flange extending about the entire boundary of platform 10. The underside of rim 11 can be open (as illustrated) or can alternately be filled with foamed resin or other suitable flotation material.

Platform 10 serves essentially as a support for the occupant or occupants of the vessel, providing a stable surface on which one may walk, stand or sit. The front end of platform 10 is illustrated as being formed in a gradually pointed prow 12, and the rear end of platform 10 is shown formed in a slightly concave configuration at 13. This particular configuration contributes primarily to the appearance of the vessel, which is not intended to be limited to any particular shape.

Fixed to the underside of platform 10 are two identical pontoons 14. Each pontoon 14 is double-ended and symmetrical along its vertical center line. The same pontoon mold can therefore be used in the production of both the left and right pontoons 14. Movement of the vessel is facilitated in either longitudinal direction due to this pontoon configuration. The pontoons 14 are illustrated as being molded as a sealed shell, which can be conventionally filled with foamed resin or other suitable flotation material. When desired, the pontoons 14 can be used as hollow sealed enclosures.

The vessel is powered in the water by a longitudinal belt 15, which has an endless configuration and which can be constructed from any conventional rubberized belt material. As seen in FIGS. 8 and 9, the belt is supported about an enlarged front pulley 16 and a smaller rear pulley 17, both mounted to the underside of platform 10 within an elevated enclosure 20. The enclosure 20 is molded integrally with platform 10, and is bounded at each side by recessed longitudinal wells 21. The wells 21 substantially fill the area between the enclosure 20 and the inner side surfaces of pontoons 14, as can be seen in FIG. 5.

The belt 15 has a plurality of identical transverse paddles 18 fixed to it and extending outwardly as seen in FIGS. 8 and 9. The paddles 18 are rigid, being either made from sheet metal or a suitable molded resin. Suitable brackets can be provided for attaching each paddle 18 to belt 15 and to facilitate replacement when desired.

The front pulley 16 is fixed to a transverse shaft 22 that is supported by sealed bearings on the upright walls of the elevated enclosure 20. The outer ends of shaft 22 mount offset crank and pedal assemblies 23 by which rotational movement is transmitted to the pulley 16 and belt 15. The crank and pedal assemblies are similar to those conventionally used on bicycles.

For practical purposes, it is necessary to provide convenient access to belt 15, which must be adjusted and replaced at operational intervals. This is provided by the assembly shown in detail in FIGS. 10 and 11. A pair of brackets 24 are pivotally mounted to the side walls of the enclosure 20 about a common transverse horizontal axis. A pulley support 25, having the configuration of a U-shaped yoke, is slidably mounted by brackets 24 along parallel axes perpendicular to the pivotal axis of brackets 24. The axis of brackets 24 is defined by pivot pins 26 which protrude outwardly therefrom. A connecting transverse bearing shaft 27 rotatably journals the rear pulley 17 that carries belt 15. Compression springs 28 encircle both legs of the pulley supports 25, being in abutment with the rear end of each bracket 24 and movable pins 30 which protrude from apertures formed through the supports 25. By selection of the apertures, the compressive forces applied by springs 28 can be increased or decreased as necessary.

The springs 28 provide a yieldable force for maintaining tension in belt 15 to keep the lower flight thereof in a horizontal plane for maximum effectiveness in transmitting forces to the water. The pulley support 25 is held in operational position by spring clips or brackets 31 mounted to the inner surfaces of enclosure 20. The brackets 31 wrap about the respective legs of supports 25. They are yieldable to permit supports 25 to pivot downwardly about the axis of pins 26 for replacement or adjustment of the belt and paddle assembly. This pivotal pulley arrangement permits ready access to the confined area within the narrow enclosure 20.

At the rear of the vessel is an upright rudder 32, formed as a flat sheet of metal or suitable reinforced resin. It is fixed to a central vertical shaft 33 rotatably journaled at the underside of platform 10 about an axis coincident with the vertical center plane of the vessel. It is therefore centered with respect to the belt 15. An offset crank arm 34 is fixed to shaft 33. Shaft 33 is pivoted about its axis through arm 34 and a connecting rigid link 36, which extends forwardly to the lower end of an upright handle 35. Handle 35 is pivoted to the side wall of one well 21. Its pivotal axis is above the connection to link 36. Pivotal movement of handle 35 is transmitted to shaft 33 to effect turning movement of rudder 32. Rudder 32 is symmetrical for maximum turning power, and can be moved to a transverse position to assist in braking forward or rearward movement of the vessel.

As can be seen in the drawings, the paddles 18 and rudder 32 are each located within the elevation of pontoon 14. Because they do not protrude lower than the pontoons, the vessel can be beached or set upon a dock or other surface without damage to the moving elements. This also contributes to efficiency of movement, since power is transmitted to the water through the long narrow channel defined between the pontoons 14 for both propulsion and steering purposes. This channeling of movement has been found to be most effective in propelling the vessel. It is very responsive and can be moved with a relative minimum of manual effort.

A vessel as illustrated in FIGS. 1 through 9 further includes a stationary seat 37 of relatively conventional design, mounted to platform 10 and its elevated enclosure 20 by fixed brackets 38. When such a seat is used, it straddles enclosure 20 and is positioned longitudinally and elevationally to permit comfortable use of the pedal and crank assembly 23 and handle 35 by one supported in seat 37. Other types of seats can be substituted in place of that shown.

A second form of seat is shown in FIGS. 12 through 15. This seat 46 is adjustable along the platform 10 to more comfortably meet the needs of an occupant. The only modification of the structure previously discussed is the use of a substantially horizontal top surface on the elevated enclosure, which is designated 39. A slight inclination along this surface serves to permit some elevational adjustment of seat 46 simultaneously with longitudinal positioning.

At the underside of seat 46 are fixed a pair of inwardly open longitudinal tracks 40. The tracks are illustrated as being formed from three plates which overlap each other. They might also be molded or extruded as an integral assembly. At each side of the raised enclosure 39 are forward brackets 41 pivoted to the enclosure 39 about a pivot axis at 42. Axis 42 is transverse and horizontal. The brackets 41 include an outwardly directed flange that is slidably received within the inwardly facing grooves of the respective tracks 40.

Figure 15:
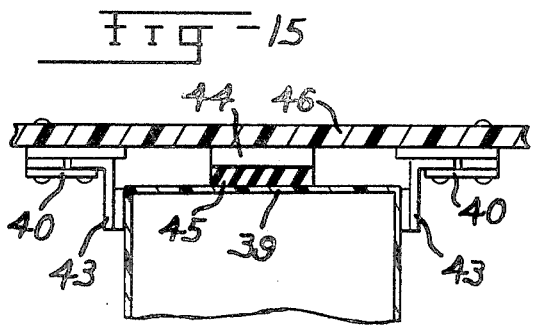
FIG. 15 is a transverse sectional view taken along line 15—15 in FIG. 13.

At the rear of the seat 46 are side guides 43, which are fastened within the grooves of the respective tracks 40. The guides 43 include vertical flanges which slidably engage the outer side surfaces of enclosure 39 (FIG. 15). They serve to laterally position seat 46 in conjunction with the brackets 41 and tracks 40.

Along the underside of seat 46 is a centrally located frictional pad 44. Pad 44 engages a longitudinal pad 45 fixed to the upper surface of enclosure 39. The pads 44, 45 are formed of material such as rubber belting. They serve to prevent longitudinal movement of seat 46 when downward pressure is exerted thereon.

The seat 46 can be adjusted longitudinally by slightly raising the rear of seat 46. This releases the frictional engagement of pads 44, 45. The side guides 43 maintain the transverse position of seat 46, which can then be moved longitudinally due to the sliding engagement of tracks 40 with the pivoted brackets 41. When the desired longitudinal position of seat 46 is achieved, it is held in place by the weight of the user, which exerts pressure between pads 44 and 45. It can be seen that one using seat 46 can easily move it while seated, by slightly lifting the rear of the seat and pulling the seat forward or backward as desired.

The particular pontoon vessel as disclosed herein is designed for recreational use by persons of any age. It may be used with safety because of the stability of its relatively wide platform 10 and the pontoons 14. The disclosed paddle and rudder assemblies provide control of the vessel. It can be easily handled by one seated on the relatively comfortable seat, where he has complete clearance to both sides of the vessel for any purpose desired. One can also stand on the platform with safety for access or for freedom of movement while using the vessel. When desired, a small electric or gas powered motor can be mounted on the vessel by use of an open aperture 47 at the center line of platform 10 rearward of the paddle assembly. The rudder 32 can be used in conjunction with such a motor.

Changes might be made in the details of the vessel within the basic framework of the concepts discussed above. Therefore, only the following claims are intended as definitions of the invention.

Having thus described my invention, I claim:

1. A pontoon vessel, comprising:
 a horizontal platform;
 a pair of longitudinal flotation pontoons parallel to one another and spaced transversely apart, said pontoons being mounted to the underside of said platform at the respective transverse sides thereof;
 a pedal-operated paddle assembly mounted to said platform along its longitudinal centerline between said pontoons, including:
 a longitudinal endless belt movably carried by front and rear pulleys rotatably mounted on said platform by shafts centered about front and rear transverse horizontal axes respectively, said belt including a horizontal lower flight extending between said pulleys parallel to and elevationally above the lower surfaces of the pontoons;
 a plurality of substantially rigid paddles spaced along the length of said belt and extending outwardly therefrom in parallel transverse positions along said lower flight;
 manually operated pedals operatively connected to a first one of said pulleys;
 said platform including:
 an elevated downwardly-open longitudinal enclosure protruding upwardly from said platform and located above the belt along the centerline of said platform, said enclosure including upright longitudinal side walls along the respective sides of the belt;
 and a pair of upwardly open longitudinal recesses protruding downwardly from said platform and extending alongside said enclosure, the respective recesses being partially bounded by the respective side walls of the enclosure;
 said platform, enclosure and recesses being integrally molded as a unitary structure extending between said pontoons.

2. The vessel set out in claim 1 wherein said side walls of said enclosure are located transversely adjacent the sides of said paddles along the belt, said side walls being extended longitudinally alongside the belt substantially coincident with the length of the belt between said pulleys.

3. The vessel set out in claim 1 wherein said side walls of said enclosure are located transversely adjacent the sides of said paddles along the belt, said side walls being extended longitudinally along the belt substantially coincident with the length of the belt between said pulleys;
   said shafts mounting the front and rear pulleys being supported by and between said side walls.

4. The vessel set out in claim 1 wherein said side walls of said enclosure are located transversely adjacent the sides of said paddles along the belt, said side walls being extended longitudinally alongside the belt substantially coincident with the length of the belt between said pulleys;
   said side walls terminating along a lower edge parallel to and substantially coplanar with the lower flight of said belt, said paddles along the lower flight of said belt being projected downward beyond the side walls.

5. The vessel set out in claim 9 wherein said side walls of said enclosure are located transversely adjacent the sides of said paddles along the belt, said side walls being extended longitudinally alongside the belt substantially coincident with the length of the belt between said pulleys;
   said side walls terminating along a lower edge parallel to and substantially coplanar with the lower flight of said belt, said paddles along the lower flight of said belt being projected downward beyond the side walls and terminating above the elevation of the lowermost surfaces of the pontoons.

6. A vessel as set out in claim 1 wherein said pedals are mounted to oppositely directed perpendicular crank arms fixed to the respective ends of the shaft mounting said first one of said pulleys.

7. A vessel as set out in claim 6, further comprising:
   adjustable tension means operatively connected between the platform and the remaining one of said pulleys.

8. The apparatus set out in claim 7, wherein said adjustable tension means comprises:
   a bracket pivotally connected to said platform about a transverse horizontal axis parallel to said pulley axes and positioned inwardly from the belt;
   a pulley support slidably mounted in said bracket along an axis perpendicular to the bracket pivotal axis, said pulley support including transverse bearing means rotatably carrying said remaining one of said pulleys;
   biasing means operatively connected between said pulley support and bracket for urging along its slidable axis in a direction toward said bearing means;
   and releasable positioning means on said platform in the pivotable path of movement of said bracket and pulley support for selectively securing said pulley support in a fixed angular position about the bracket axis.

9. A vessel as set out in claim 1, further comprising:
   a seat straddling said enclosure at a location rearward and elevationally above said pedals.

10. The apparatus as set out in claim 9 further comprising:
   outwardly projecting longitudinal brackets pivotally mounted to the respective sides of said elevation enclosure about a transverse pivotal axis;
   means on said seat for longitudinal slidable engagement of said brackets;
   and means on the underside of said seat intermediate said brackets for frictionally engaging the elevated enclosure.

* * * * *